United States Patent [19]

Lowndes

[11] 4,142,179

[45] Feb. 27, 1979

[54] SAFETY WARNING LAMPS FOR ADVERSE OR HAZARDOUS ATMOSPHERES

[76] Inventor: Roy B. W. Lowndes, 79 Hollie Lucas Rd., Kings Heath, Birmingham, England

[21] Appl. No.: 694,814

[22] Filed: Jun. 10, 1976

Related U.S. Application Data

[63] Continuation of Ser. No. 512,161, Oct. 4, 1974, abandoned.

[30] Foreign Application Priority Data

Oct. 5, 1973 [GB] United Kingdom ............... 46068/73

[51] Int. Cl.$^2$ .............................................. G08B 5/00
[52] U.S. Cl. .............................. 340/321; 174/17 VA; 174/50; 340/81 R; 340/118; 340/331; 362/363; 362/373
[58] Field of Search ............... 340/331, 332, 333, 216, 340/114 R, 114 B, 118, 119, 321, 81 R; 240/11.3, 11.2 R, 11.2 E; 174/17 VA, 50; 315/136; 313/110, 312; 317/148.5 B; 361/205; 362/363, 373, 374

[56] References Cited

U.S. PATENT DOCUMENTS

| | | | |
|---|---|---|---|
| 2,316,835 | 4/1943 | Blood | 174/50 |
| 2,756,412 | 7/1956 | Harrington | 340/252 |
| 3,059,231 | 10/1962 | Arneberg, Jr. et al. | 340/381 |
| 3,202,979 | 8/1965 | Lemelson | 340/321 |
| 3,266,015 | 9/1966 | Pickering et al. | 340/81 R |
| 3,384,789 | 5/1968 | Teshima | 317/146 |
| 3,488,630 | 1/1970 | Decker et al. | 340/81 R |
| 3,500,378 | 3/1970 | Pickering et al. | 340/321 |
| 3,519,984 | 7/1970 | Zychal | 340/25 |
| 3,675,007 | 7/1972 | Appleton et al. | 240/11.2 E |
| 3,724,706 | 4/1973 | Slocum | 220/3.8 |

OTHER PUBLICATIONS

Electrical Construction and Maintenance, Nov. 1953, pp. 88-90.

Primary Examiner—John W. Caldwell, Sr.
Assistant Examiner—James J. Groody
Attorney, Agent, or Firm—Mason, Fenwick & Lawrence

[57] ABSTRACT

A warning lamp for use in hazardous atmospheres including three air-filled volumes interconnected by a passageway between screw threads whereby, in the event of an explosion, each of the volumes stores a quantity of explosive gases prior to permitting escape thereof along the passageway between the screw threads thereby providing a warning lamp which causes hot gases to be cooled sufficiently and quenched in the three volumes therein.

2 Claims, 5 Drawing Figures

SAFETY WARNING LAMPS FOR ADVERSE OR HAZARDOUS ATMOSPHERES

This is a continuation of application Ser. No. 512,161 filed Oct. 4, 1974, now abandoned.

The present invention relates to improvements in or relating to warning lamps.

Known warning lamps are of the mechanical rotating type which use electric motors, gears, belts and pulleys. The main disadvantage of these lamps is that they tend to generate heat and sparks during operation and therefore are not suitable for use in hazardous atmospheres where there is the danger of an explosion.

An object of the present invention is to obviate or mitigate the above disadvantage.

According to the present invention there is provided a warning lamp for use in hazardous atmospheres, comprising a light element, control means electrically connected to said light element for controlling said light element, a control means housing for encapsulating said control means, said control means housing having a passage extending from within said housing to said hazardous atmosphere, said passage being sufficiently narrow to prevent ingress of said hazardous atmosphere into said control means housing but, in the event of a fault in the control means within the control means housing, will allow any hot gases formed thereby to escape through said passage to said hazardous atmosphere, the gases in the course of escaping being cooled sufficiently to prevent ignition of said hazardous atmosphere by the escaping gases.

Further according to the present invention there is provided a warning lamp for use in adverse weather conditions, comprising a light element, control means electrically connected to said light element, a plate having a central aperture in which is mounted a socket for said light element, a control means housing encapsulating said control means, said housing being secured to said plate so as to surround the base of said socket, a light magnifying dome surrounding said light element and mounted on said plate, a hollow lamp housing having a closed end and an open end, said open end being adapted to be closed by said plate so as to enclose said control means housing within said lamp housing, and fastening means for fastening said plate over the opening of said lamp housing, the mating surfaces between the plate, the magnifying dome, the lamp housing, and the control means housing having sealing gaskets interposed therebetween.

Embodiments of the present invention will now be described by way of example with reference to the accompanying drawings in which.

Figure 1:
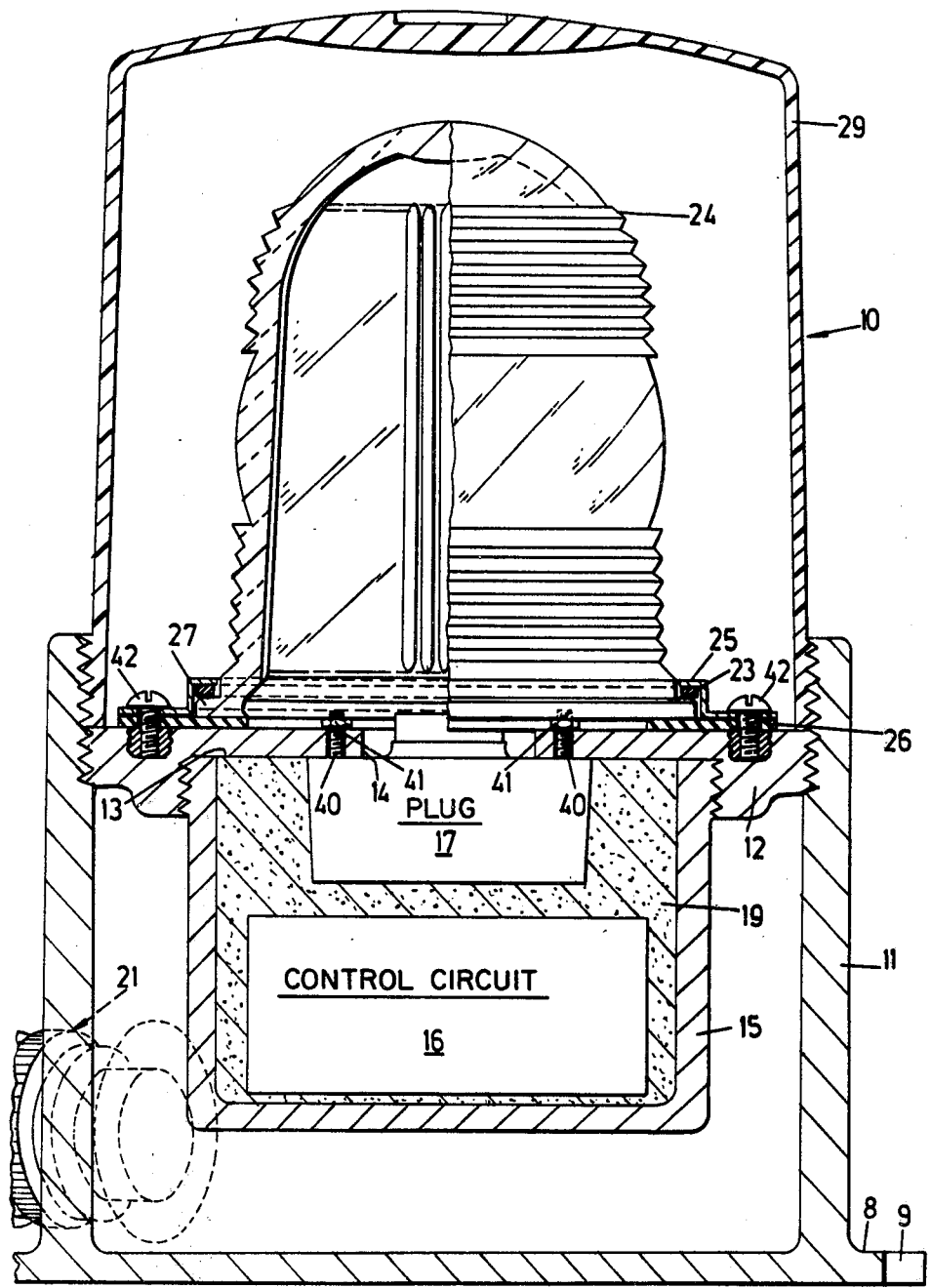
FIG. 1 is a cross sectional elevation of a warning lamp according to a first embodiment of the present invention for use in hazardous atmospheres.
Figure 2:
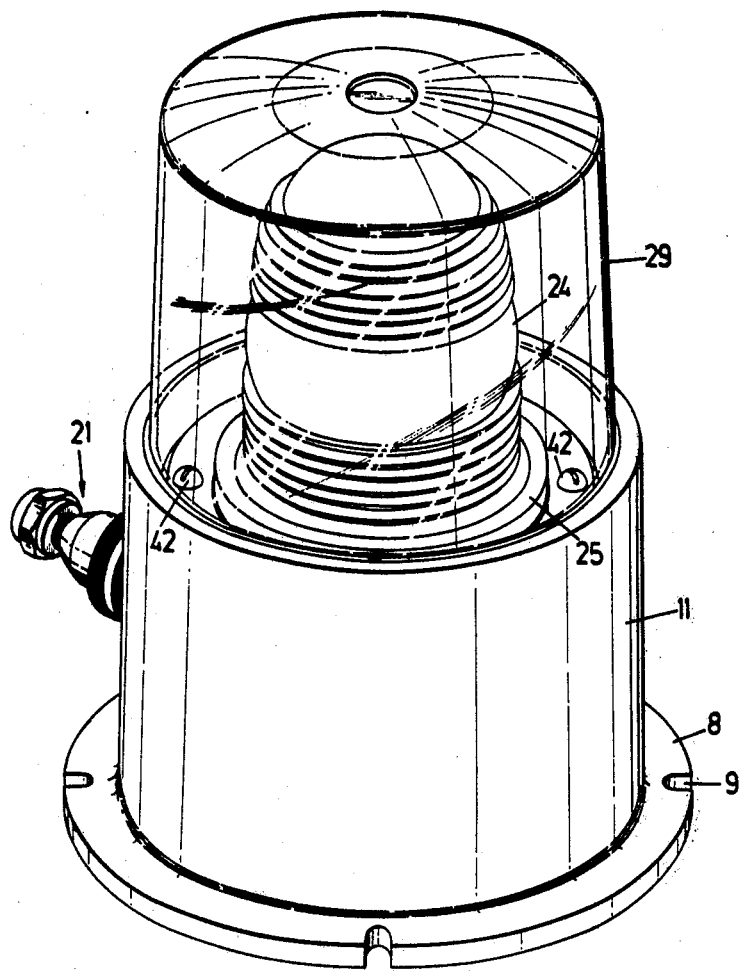
FIG. 2 is a perspective view of the warning lamp in FIG. 1 drawn to a smaller scale.

In FIGS. 1 and 2, a lamp 10 comprises a cylindrical housing 11, open at one end and closed at the other. The closed end of the housing 11 has a flange 8 with bolt holes 9 therein to enable the lamp 10 to be mounted at a suitable location, and the open end of the housing 11 has a screw-threaded portion to which is screwed a cylindrical cover plate 12 which has a cylindrical recess 13 on its underside and a central aperture 14 extending from the recess 13 to the upper surface of the cover plate 12. The sides of the recess 13 are screw-threaded and are adapted to receive a cylindrical housing 15 open at one end and closed at the other, said open end being screw-threaded and adapted to engage the screw threads in said recess 13. The housing 15 contains control means 16 for operating the lamp 10, the control means 16 being connected to an octal plug 17 secured to the underside of the plate 12 by studs 40 and nuts 41 and on which a light element in the form of a Xenon gas discharge lamp (not shown) is mounted, the octal plug being designed to fit closely into the aperture 14 in the cover plate 12. The control means 16 is completely encapsulated in a potting compound 19 to prevent the possibility of short circuits in the control means 16 from igniting the hazardous atmosphere in which the lamp is situated.

Electrical power for operating the control means 16 is provided by a cable (not shown) which enters the lamp housing 11 and the control means housing 15 through gas tight glands, only one of which (21) is shown. The supply may be taken from the main supply in a building or ship or from a battery.

A glass dome 24, only half of which is shown in section, surrounds the Xenon lamp (not shown) and is mounted on the upper surface of the cover plate 12 by a clamping ring 25 which is fixedly mounted on the cover plate 12 for example by screws 42. The clamping ring 25 clamps a flanged portion 27 of the glass dome 24 between two annular seals 23 and 26 made of rubber. The design of the glass dome 24, is such that a flash from the Xenon lamp is magnified many times to produce a brilliant flash which will penetrate low visibility atmospheres. To increase further the brilliance of the Xenon lamp a reflector (not shown) may be mounted on the cover plate 12, surrounding the Xenon lamp. The lamp 10 is provided with a protective polycarbonate dome 29 which has a screw-threaded portion at its open end which engages a complementary screw-threaded portion on the inner surface of the lamp housing 11 thereby fixing the dome 29 to the lamp housing 11 and the cover plate 12.

Since the lamp is designed for use in hazardous atmospheres, all the screw-threaded portions in the lamp 10 are provided with a minimum of nine screw threads, the mating surfaces of which are machined to produce a 0.002 inch gap between the mating surfaces of the threads. If a fault occurs within the lamp, hot gases would form under pressure within the lamp, and these gases if allowed to contact the hazardous atmosphere directly, would most likely cause an explosion. To prevent an explosion and reduce the internal pressure in the lamp, the gases are vented to the atmosphere through the narrow gaps between the threads. In passing through these gaps under pressure, the gases are cooled sufficiently so that by the time they contact the hazardous atmosphere, the temperature of the gases is not high enough to ignite the atmosphere and cause an explosion. The use of a minimum of nine screw threads produces a passage length from the interior of the casing to the hazardous atmosphere which will allow sufficient cooling of any gases which may form within the casing before they reach the hazardous atmosphere. Also, the gaps are sufficiently small to prevent the ingress of the hazardous atmosphere into the lamp 10. The use of this type of screw thread is especially important for the control means housing 15 since it would obviate the danger of an explosion from a short circuit in the control means 16.

Also, to prevent the danger of sparking between metal surfaces, the housing 11, the cover plate 12, the housing 15, the clamping ring 25 are all made of stainless steel.

Figure 3:
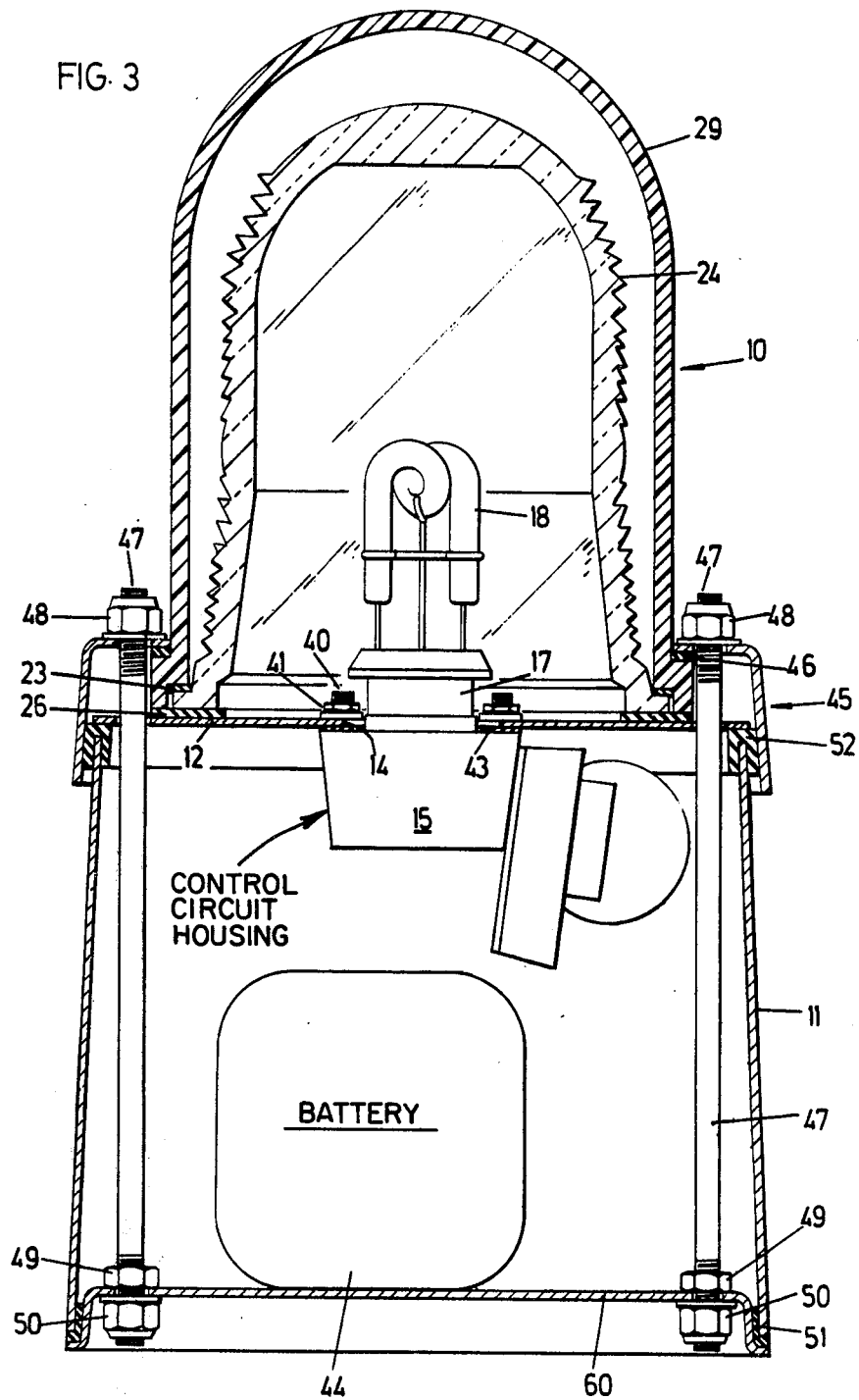
FIG. 3 is a cross sectional elevation of a warning lamp according to a second embodiment of the present invention for use in adverse weather conditions.

In FIG. 3, in which like numerals are used for like parts in FIGS. 1 and 2, a weatherproof warning lamp 10 comprises a generally cylindrical lamp housing 11 closed at its base by a base plate 60 and at its other end by a cover plate 12 with weather sealing grommets 51 and 52 interposed between the mating surfaces. The cover plate 12 has a central aperture 14 in which an octal plug 17 is fitted which supports a Xenon gas discharge lamp 18. Control means for the Xenon lamp 18 are contained in a control means housing 15 which is secured to the underside of the cover plate 12 by studs 40 and nuts 41 with an annular seal 43 located between the plate 12 and the housing 15. The control means in the housing 15 are completely encapsulated in a potting compound to protect the components from dampness. Electrical power for the control means is supplied by a rechargeable battery 44.

A glass dome 24, similar to the one in FIGS. 1 and 2, rests on a rubber annular seal 26. A protective polycarbonate dome 29 having a stepped portion at its open end rests on said annular seal 26 and on a further annular seal 23 between the flanged portion of the glass dome 24 and the stepped portion of the polycarbonate dome 29.

The polycarbonate dome 29 and the glass dome 24 are secured to the cover plate 12 and the lamp housing 11 by a clamping ring 45, the inner rim of which bears against the stepped portion of the polycarbonate dome 29 with a further annular seal 46 interposed between the mating surfaces. The clamping ring 45 is fastened to the lamp housing 11 by a pair of bolts 47 and associated nuts 48, 49 and 50, which bolts pass through apertures in the clamping ring 45, the cover plate 12 and the base plate 50.

The Xenon gas discharge lamp 18 is designed to have a single turn of a helix so that the greatest intensity light from the lamp is concentrated adjacent the magnifying portion of the dome 10.

Figure 4:
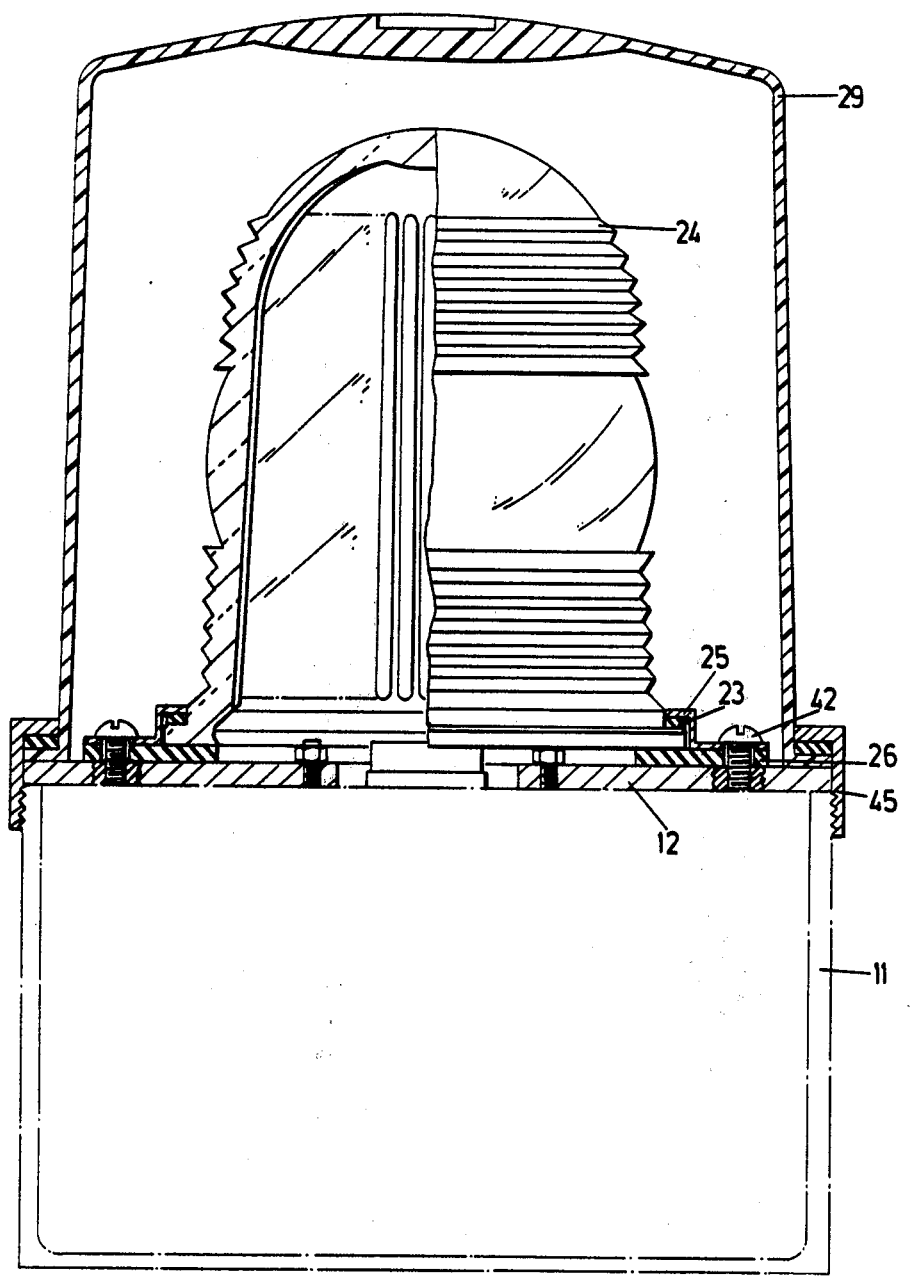
FIG. 4 is a cross sectional elevation of part of a warning lamp according to a third embodiment of the present invention for use in adverse weather conditions.

In FIG. 4, an alternative configuration of the weatherproof lamp in FIG. 3 is shown with only essential differences being shown. The lamp housing 11 is generally cylindrical and has a closed end and an open end. The open end of the housing is threaded externally and is adapted to engage an internally threaded clamping ring 45. The polycarbonate dome 29 has a flanged open end, the flange on the open end being clamped to the cover plate 12 and the body 11 by the clamping ring 45 when screwed on to the body. An annular weather seal 23 is located between the clamping ring 45 and the flange of the dome 29. Also, the glass dome 24 is secured to the cover plate 12 by a further clamping ring 25. As a further alternative, the polycarbonate dome in both FIGS. 3 and 4 may be omitted.

The warning lamps disclosed in FIGS. 3 and 4 are especially suitable for use on vehicles such as police cars and ambulances. They are also suitable for marking road work.

Figure 5:
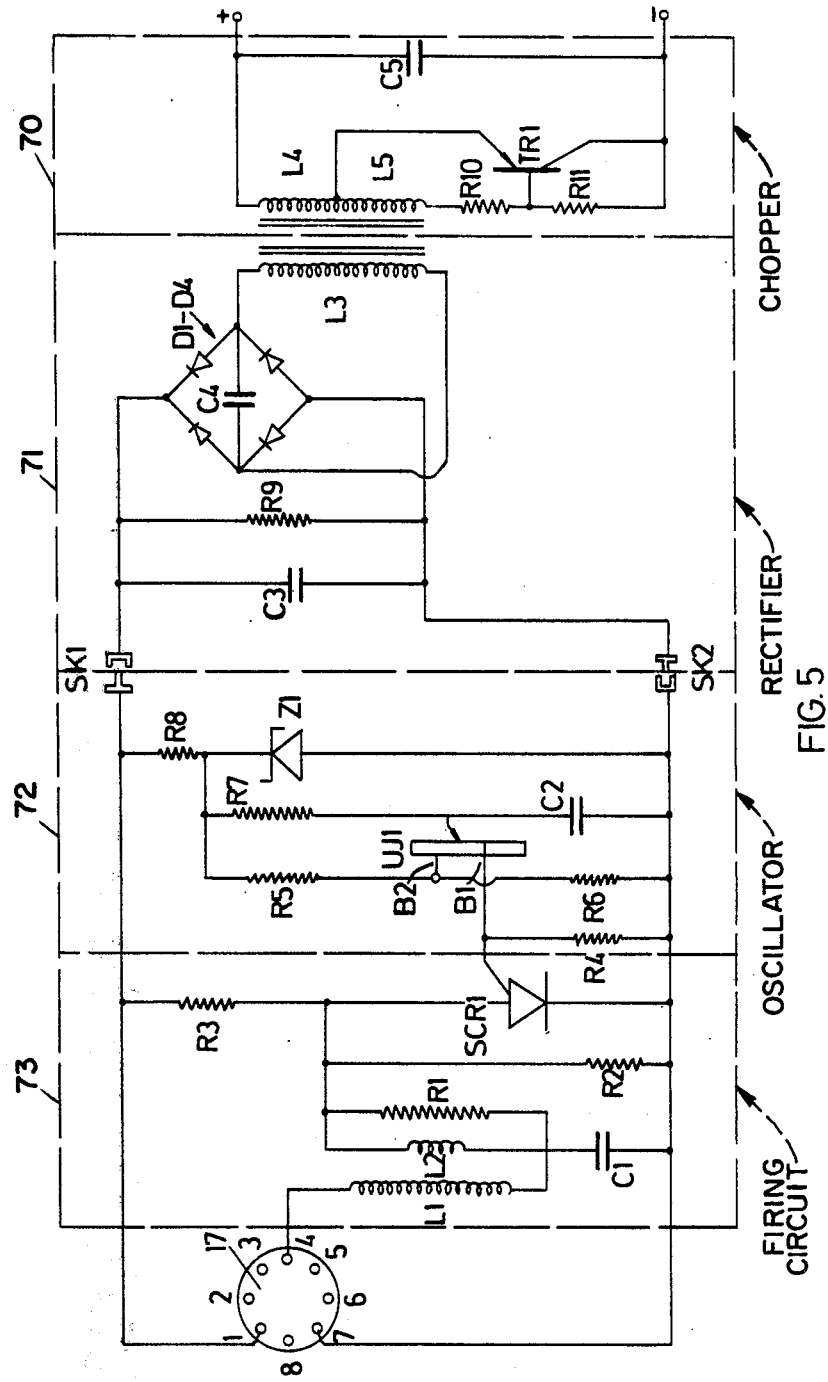
FIG. 5 is a circuit diagram of the control means for the lamps shown in FIGS. 1 to 4.

In FIG. 5, the circuit for operating the lamps 10 includes a chopper circuit 70 which comprises a capacitor C5, inductors L4, L5, resistors R10, R11 and a P-N-P transistor TR1. A.D.C. supply from a cable or battery is connected across the capacitor C5 and the D.C. voltage is chopped and transformed by the inductors L4, L5 which are inductively coupled to an inductor L3 in a rectifier circuit 71. The rectifier circuit 71, which comprises the inductor L5, a bridge rectifier having diodes D1-D4, capacitors C3, C4 and a resistor R9, rectifies the transformed voltage and supplies the rectified voltage via plugs SK1, SK2 to an oscillator circuit 42. The oscillator circuit 72 comprises resistors R4-R8, a capacitor C2, a zener diode Z1 and a unijunction transistor UJ1. The output of the oscillator circuit 42 is taken from the base B1 of the unijunction transistor UJ1 and is connected to the gate of a silcon controlled rectifier SCR1 of a lamp firing circuit 73. The lamp firing circuit 73 comprises the silicon controlled rectifier SCR1, resistors R1, R2 and R3 the capacitor C1 and mutually coupled inductors L1 and L2. The firing circuit is connected to the terminals 1, 4, and 7 of the octal plug 17 on which the Xenon gas discharge lamp is mounted.

The circuit operates as follows. The D.C. voltage supply, normally 12 volts, is chopped by the chopper circuit 70, transformed by the inductors L3, L4, L5, the voltage being stepped up during transformation, and rectified by the rectifier circuit 71. The rectified voltage is used to supply the oscillator circuit 72 and to charge the capacitor C1 in the firing circuit 43 via the resistor R3 and the inductor L2. The output of the oscillator 72 turns the silicon controlled rectifier SCR1 on and off alternately which causes the capacitor C1 to charge and discharge alternately. The resultant current flowing through the inductor L2 is induced into the inductor L1, the number of windings in the inductors L1, L2 being arranged to further step-up the voltage, to, for example 500-1000V.

The voltage induced in the inductor L1 is applied to the control electrode of the lamp 18 which causes the Xenon lamp to flash intermittently. By adjusting the values of the components in the oscillator circuit 72, the rate of flashing of the Xenon lamp may be varied as required.

In a modification of the lamp in FIGS. 1 and 2, the electrical circuit may be contained in a housing which is separate from the lamp. For example, on ships the lamp may be mounted on the top of a mast and the electrical circuit may be located on the bridge and be electrically connected to the lamp by a cable. In such an application the casing 15 may take the form of a rectangular box which is closed by a lid bolted to the top of the box with the mating surfaces between the lid and the edges of the box being machined to produce a gap of 0.002 inches between the mating surfaces. This gap again would cool any hot gases escaping from within the box.

All the lamps may be mounted on to a bag, made from thermoplastic or other suitable material, which bag contains shock absorbing material so that the lamp may be dropped from heights without sustaining any damage. The bag may also include a portion for inserting ballast so that the lamp would always right itself when dropped from a height. Such lamps could be used for parachute drops, helicopter landing areas, motorway marker lights etc.

Although the lamps hereinbefore described are Xenon gas discharge lamps, other gas discharge lamps or filament lamps may also be used.

I claim:

1. A warning lamp for use in hazardous atmospheres comprising
    a hollow base member having an open end,
    a plate member connected to the base member across the open end thereof, said plate member having a centrally-disposed aperture therethrough, being circular, and having peripheral surfaces with a first screw threaded portion and a second screw threaded portion,
    a hollow housing having an open end and having a screw threaded portion adjacent its open end engaging said first screw threaded portion of said plate member within the hollow base member and defining a first air filled volume between the housing and the base member,
    a plug for receiving a light-emitting, said plug being mounted within said hollow housing and projecting into the aperture in the plate member,
    a light-emitting element in the form of a xenon gas-discharge lamp secured to said plug and projecting to the other side of the plate member from said hollow housing,
    a transparent light-magnification dome mounted on said plate member and surrounding said gas-discharge lamp to define a second air filled volume between the lamp and the dome,
    a generally cylindrical transparent protective dome formed of polycarbonate and surrounding the light focusing dome to define a third air filled volume between the magnification dome and the protective dome,
    electrical control means encapsulated in a potting compound within said hollow housing and connected to said plug to cause said light-emitting element to flash intermittently, said protective dome having a screw threaded portion on its outer surface adjacent its open end, and the hollow base member being cylindrical and having a screw-threaded portion on its inner surface adjacent its opening end engaging the screw-threads of the second screw threaded portion on said peripheral surface of the circular plate member and the screw-threads on said protective dome, said screw-threads forming a passageway for escaping hot gases wherein a temperature reduction occurs, whereby in the event of an explosion each of said volumes stores a quantity of explosive gases prior to permitting escape thereof along said passageway.

2. The warning lamp of claim 1, wherein said gas-discharge lamp includes a control electrode, an anode and a cathode and wherein said electrical control means comprises a pair of input terminals for receiving an AC voltage supply, an oscillator circuit connected to said input terminals, a silicon controlled rectifier having anode and cathode electrodes connected to said input terminals and having a trigger electrode connected to the output of said oscillator circuit, and first and second mutually-coupled inductance coils, the first of said coils being connected in parallel with said silicon controlled rectifier and the second of said coils being connected to the control electrode of the gas-discharge lamp, the anode and cathode of said gas-discharge lamp being connected to said input terminals.

* * * * *